US010125917B2

(12) United States Patent
Pass

(10) Patent No.: US 10,125,917 B2
(45) Date of Patent: Nov. 13, 2018

(54) MEMBRANE BONDED ANCHOR ARRANGEMENT

(71) Applicant: LATCHWAYS PLC, Devizes (GB)

(72) Inventor: Andrew Pass, Wiltshire (GB)

(73) Assignee: Latchways PLC, Wiltshire (GB)

( * ) Notice: Subject to any disclaimer, the term of this patent is extended or adjusted under 35 U.S.C. 154(b) by 0 days.

(21) Appl. No.: 14/770,259

(22) PCT Filed: Feb. 27, 2014

(86) PCT No.: PCT/GB2014/050588
§ 371 (c)(1),
(2) Date: Aug. 25, 2015

(87) PCT Pub. No.: WO2014/132068
PCT Pub. Date: Sep. 4, 2014

(65) Prior Publication Data
US 2016/0010792 A1    Jan. 14, 2016

(30) Foreign Application Priority Data

Feb. 28, 2013 (GB) .................................. 1303607.4

(51) Int. Cl.
*E04B 5/00* (2006.01)
*F16M 13/02* (2006.01)
*E04G 21/32* (2006.01)

(52) U.S. Cl.
CPC ........... *F16M 13/02* (2013.01); *E04G 21/328* (2013.01)

(58) Field of Classification Search
CPC ............................. F16M 13/02; E04G 21/328
(Continued)

(56) References Cited

U.S. PATENT DOCUMENTS 5,797,232 A * 8/1998 Larson .................... E04D 5/142
411/147
6,868,647 B2 * 3/2005 Poldmaa ............ A62B 35/0068
182/45
(Continued)

FOREIGN PATENT DOCUMENTS

DE   202004018587 U1   3/2005
EP       1690567 A2    8/2006
(Continued)

OTHER PUBLICATIONS

International Search Report in the related PCT Application No. PCT/GB2014/050588 dated May 15, 2014.
(Continued)

*Primary Examiner* — Basil S Katcheves
(74) *Attorney, Agent, or Firm* — Troutman Sanders LLP; Ryan A. Schneider

(57) ABSTRACT

An anchor arrangement for mounting to a membrane skin of a structure has a mounting bracket, including a mounting flange provided with one or more fixing apertures and a metallic rigid mounting plate arranged to underlay the anchor mounting bracket and provided with one or more fixing apertures arranged to match up with the aperture(s) in the anchor mounting bracket. A membrane layer lies contiguous with the metallic rigid plate, provided between the metallic rigid plate and the anchor mounting bracket mounting flanges, the membrane layer being bonded to the metallic rigid plate.

20 Claims, 1 Drawing Sheet

(58) Field of Classification Search
USPC .................................. 52/408, 173.1, 24, 26
See application file for complete search history.

(56) References Cited

U.S. PATENT DOCUMENTS

| | | | | |
|---|---|---|---|---|
| 7,703,256 | B2* | 4/2010 | Haddock | F16B 5/0004 52/24 |
| 8,448,405 | B2* | 5/2013 | Schaefer | E04C 3/06 52/60 |
| 8,448,407 | B1* | 5/2013 | Wiener | F16B 5/0275 126/623 |
| 8,631,629 | B1* | 1/2014 | Wiener | F16B 5/0275 126/623 |
| 8,752,338 | B2* | 6/2014 | Schaefer | F24J 2/5245 52/173.3 |
| 2002/0066235 | A1 | 6/2002 | Stearns | |
| 2008/0087275 | A1* | 4/2008 | Sade | F24J 2/5235 126/623 |
| 2010/0192505 | A1* | 8/2010 | Schaefer | A47B 96/14 52/653.2 |
| 2012/0102853 | A1* | 5/2012 | Rizzo | F24J 2/5245 52/173.3 |
| 2012/0233958 | A1 | 9/2012 | Stearns | |
| 2013/0009025 | A1 | 1/2013 | Stearns | |
| 2016/0010792 | A1* | 1/2016 | Pass | F16M 13/02 248/231.91 |

FOREIGN PATENT DOCUMENTS

| | | |
|---|---|---|
| EP | 1698747 A2 | 8/2006 |
| EP | 2511448 A1 | 10/2012 |
| NL | 1031567 C1 | 5/2006 |
| WO | 2007089139 A2 | 8/2007 |

OTHER PUBLICATIONS

Search Report under Section 17 in the related GB Patent Application 1303607.4, searched Jul. 26, 2013.

* cited by examiner

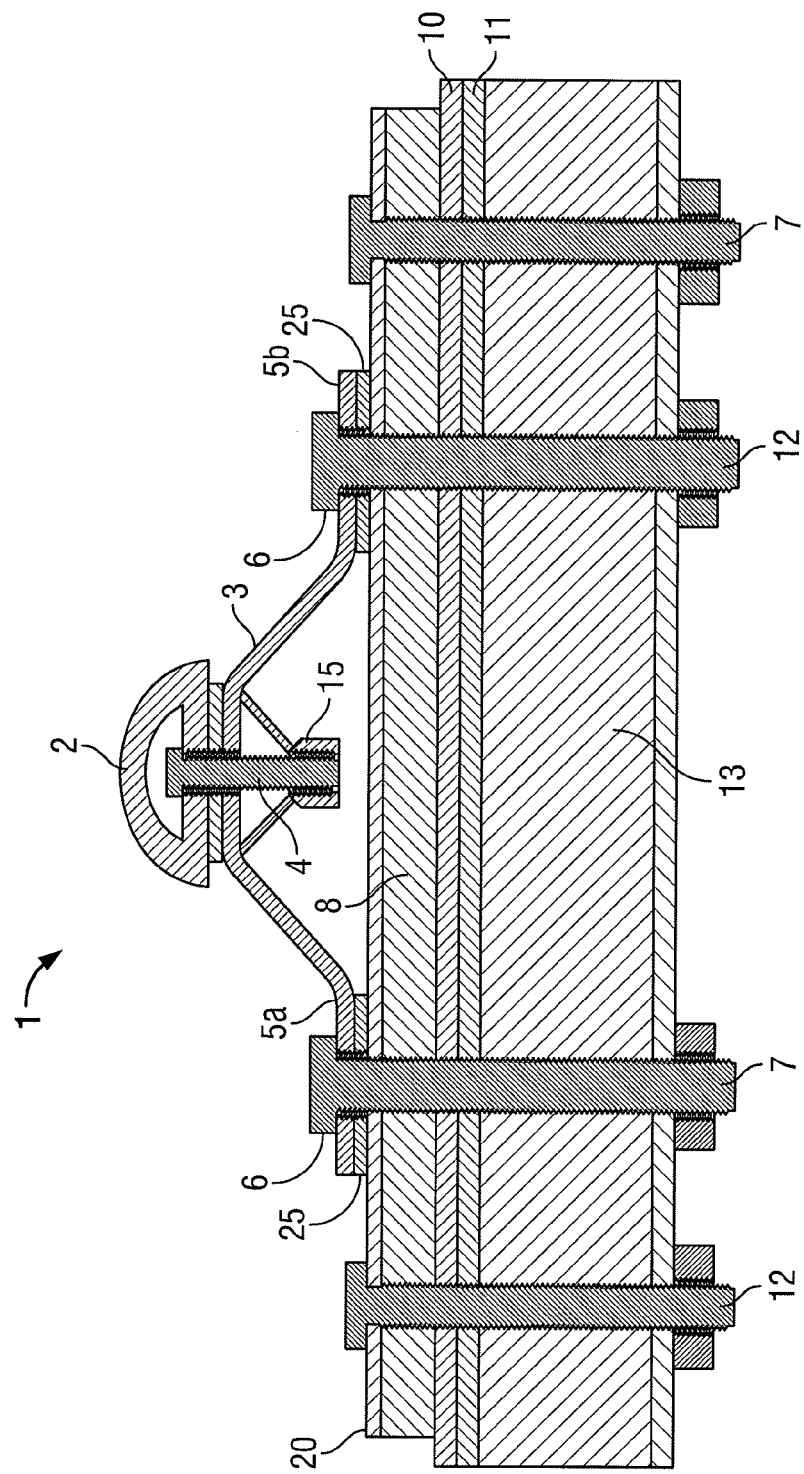

MEMBRANE BONDED ANCHOR ARRANGEMENT

CROSS-REFERENCE TO RELATED APPLICATIONS

This application is a US National Stage of International Application No. PCT/GB2014/050588, filed 27 Feb. 2014, which claims the benefit of GB 1303607.4, filed 28 Feb. 2013, both herein fully incorporated by reference.

The present invention relates to an anchor arrangement for mounting to a membrane skin of a structure.

In particular the invention relates to an anchor that is particularly suited to load bearing applications on such structures, where loads are only present intermittently or occasionally. For example abseil cradles for inspections or window cleaning on buildings are relatively infrequently used, but require secure anchor mountings for use. Typically secure anchors need to be mounted directly to the steel framework structure to which the membrane skin roof or wall panels are secured. Mounting of anchors directly to the membrane skin cladding is not generally advised as this would typically result in damage/deformation of the membrane skin panel in the event of an applied load.

An improved arrangement has now been devised.

According to the present invention, there is provided an anchor arrangement for mounting to a membrane skin of a structure, the anchor arrangement comprising:
 an anchor mounting bracket, including a mounting flange provided with one or more fixing apertures;
 a load distribution plate arranged to underlay the anchor mounting bracket and provided with one or more fixing apertures arranged to match up with the aperture(s) in the anchor mounting bracket.
 a membrane layer contiguous with the load distribution plate, provided between the load distribution plate and the anchor mounting bracket mounting flanges, the membrane layer being bonded to the load distribution plate.

Typically the load distribution plate is metallic and/or rigid.

It is preferred that the membrane layer is substantially coextensive with the load distribution plate.

It is preferred that the membrane layer is bonded to the load distribution plate over substantially the entire area over which they coextend.

The membrane layer is preferably a plastics membrane layer.

Beneficially, a membrane layer is also provided on the anchor mounting bracket mounting flange, the membrane layer on the anchor mounting bracket mounting flange being arranged to provide a membrane bond with the a membrane layer contiguous with the load distribution plate.

The membrane layer provided on the anchor mounting bracket mounting flange is preferably of substantially the same material (or the identical material) as the a membrane layer contiguous with the load distribution plate.

In certain embodiments, it is preferred that the load distribution plate extends beyond the footprint of the anchor mounting bracket. In such an arrangement it may be preferred that the load distribution plate is provided with fixing apertures at a position spaced from the footprint of the anchor mounting bracket.

It is preferred that, in addition to mechanically fixing, the load distribution plate is bonded to the underlying membrane skin of the structure.

Beneficially, the thickness/depth of the load distribution plate is greater than the thickness/depth of the anchor mounting bracket flange.

In a preferred embodiment, the anchor mounting bracket includes a raised section spaced from a peripheral section (preferably a peripheral flange), the anchor mounting being at the position of the raised section.

It is preferred that an anchor member (such as a D ring) is rotatably mounted to the anchor mounting bracket.

Beneficially, the anchor arrangement is provided with bolts arranged to pass through the bracket and the metallic rigid mounting plate.

The arrangement may beneficially be used for an abseil anchor arrangement.

According to an alternative aspect, the invention provides a method of mounting an anchor arrangement to a membrane skin of a structure, the method comprising providing a load distribution plate arranged to underlay an anchor mounting bracket wherein a membrane layer is provided between the load distribution plate and the anchor mounting bracket, the membrane layer being bonded to the load distribution plate.

According to a broader aspect the invention provides an anchor arrangement for mounting to a membrane skin of a structure, the anchor arrangement comprising:
 an anchor mounting bracket;
 a load distribution plate to be fixed to the membrane skin of the structure and arranged to underlay the anchor mounting bracket and provided with one or more fixing;
 a membrane layer contiguous with the load distribution plate, provided between the metallic rigid load distribution plate and the anchor mounting bracket, the membrane layer being bonded to the load distribution plate.

Typically the load distribution plate is rigid and/or metallic

The invention will now be further described by way of example only and with reference to the accompanying drawing which is a schematic representation of an anchor arrangement in accordance with the present invention secured to a roof structure.

FIG. 1 is a schematic representation of an anchor arrangement in accordance with the present invention secured to a roof structure.

Referring to FIG. 1, there is shown an anchor arrangement 1 for mounting an anchor to a roof membrane 10. The roof membrane is a plasticised coating or layer which clads the profiled metallic roof panel 11 as is common for such structures. The roof structure includes an inner skin 12 and an insulation layer 13.

The anchor arrangement comprises an anchor member in the form of a rotating D-ring 2 which is rotatably held in a rotatable bush by means of a threaded bolt 4 which secures into a receiving aperture in a boss 15 of an anchor mounting bracket base plate 3. The bracket base plate 3 is provided with peripheral flanges 5a 5b which are provided with respective apertures 6 for receiving toggle bolts 7. The anchor mounting bracket base plate includes a raised section spaced from a peripheral section incorporating the flanges 5a 5b. The anchor member D ring 2 is mounted at the position of the raised section.

A problem with securing an anchor bracket base plate directly to the roof membrane outer skin using mechanical fixings such as securing is that if a load is applied to the anchor bracket base plate the membrane skin can distort at the location of the securing bolts. The present invention seeks to address this.

In accordance with the invention the anchor mounting bracket base plate 3 is arranged to be secured to the roof membrane skin 10, 11 by means of an intermediate securing arrangement comprising a metallic rigid load distribution plate 8 through which toggle bolts 7, 12 pass. Toggle bolts 7 pass through both the apertures in the flanges 5a 5b of the anchor bracket base plate 3 and also the apertures in the load distribution plate 8 in order to secure the anchor bracket base plate to the roof membrane. Toggle bolts 12 are positioned spaced outwardly of the footprint of the anchor bracket base plate 3 and pass through the load distribution plate 8 but not the anchor bracket base plate 3. Toggle bolts 12 secure the load distribution plate 8 to the roof membrane.

For an improvement to the securing arrangement the lower surface of the load distribution plate 8 can be bonded over its entire surface to the adjacent surface of the roof membrane skin. This may be achieved by using a solvent based adhesive such as, for example TPE, TPO, PVC, or EPDM in conjunction with application of heat to the bonding area, if required. The aim is to ensure the formation of a mechanical bond at a molecular level.

The underside of a plastics membrane skin 20 (of the same material as the roof membrane skin 10 of the structure) is similarly bonded to the upper surface of the load distribution plate 8. Again this bond is achieved over the entire upper surface of the anchor mounting plate using a solvent based adhesive such as, for example TPE, TPO, PVC, or EPDM in conjunction with application of heat to the bonding area, if required. The aim is to ensure the formation of a mechanical bond at a molecular level.

The anchor bracket base plate 3 is secured to the anchor mounting plate by means of toggle bolts 7 passing through apertures in the anchor base plate. Additionally the anchor base plate is secured to the upper surface of the membrane 20 present on the load distribution plate 8 by means of an adhesive bond. A plastics membrane layer 25 is provided on the underside of the anchor mounting bracket mounting flanges 5a 5b, which is is preferably of substantially the same material (or the identical material) as the a membrane layer contiguous with the load distribution plate. This enables the formation of an adhesive bond is again arranged to form a mechanical bond at molecular level between the anchor base plate 3 and the membrane 20 provided on the upper surface of the load distribution plate 8.

As a result of bonding the anchor base plate bracket 3 to the load distribution plate via the intermediate membrane 20 which is in turn bonded to the load distribution plate over its entire surface, when load is applied to the anchor base plate bracket 3 via the D-ring 2 the force is spread over the entire surface of the load distribution plate 8 rather than acting purely at the location of the toggle mounting bolts. This aids in preventing the roof membrane itself from becoming distorted.

The invention claimed is:

1. An anchor arrangement for mounting to a membrane skin of a structure, the anchor arrangement comprising:
   an anchor mounting bracket, including a mounting flange provided with an anchor mounting bracket fixing aperture;
   a metallic rigid mounting plate arranged to underlay the anchor mounting bracket and provided with a mounting plate fixing aperture arranged to match up with the anchor mounting bracket fixing aperture; and
   a membrane layer contiguous with the metallic rigid mounting plate, provided between the metallic rigid mounting plate and the anchor mounting bracket mounting flange, the membrane layer being bonded to the metallic rigid mounting plate;
   wherein the membrane layer is coextensive with the metallic rigid mounting plate.

2. The anchor arrangement according to claim 1, wherein the membrane layer is bonded to the metallic rigid mounting plate over substantially the entire area of the membrane layer.

3. The anchor arrangement according to claim 1, wherein the membrane layer is a plastics membrane layer.

4. The anchor arrangement according to claim 1, wherein the metallic rigid mounting plate extends beyond the footprint of the anchor mounting bracket.

5. The anchor arrangement according to claim 1, wherein the metallic rigid mounting plate is provided with two or more mounting plate fixing apertures at positions spaced from the footprint of the anchor mounting bracket.

6. The anchor arrangement according to claim 1, wherein the metallic rigid mounting plate is bonded to the membrane skin of the structure.

7. The anchor arrangement according to claim 1, wherein the thickness of the metallic rigid mounting plate is greater than the thickness of the anchor mounting bracket flange.

8. The anchor arrangement according to claim 1, wherein the anchor mounting bracket includes a raised section spaced from a peripheral section, the anchor mounting bracket being at the position of the raised section.

9. The anchor arrangement according to claim 8, wherein the peripheral section comprises a peripheral flange.

10. The anchor arrangement according to claim 1, wherein an anchor member is rotatably mounted to the anchor mounting bracket.

11. The anchor arrangement according to claim 1 further comprising bolts arranged to pass through the anchor mounting bracket and the metallic rigid mounting plate.

12. The anchor arrangement according to claim 1 comprising an abseil anchor.

13. The anchor arrangement according to claim 1, wherein the depth of the metallic rigid mounting plate is greater than the depth of the anchor mounting bracket flange.

14. The anchor arrangement according to claim 1 further comprising a second membrane layer provided on an underside of the anchor mounting bracket mounting flange, the second membrane layer on the anchor mounting bracket mounting flange providing a membrane bond with the membrane layer contiguous with the metallic rigid mounting plate.

15. The anchor arrangement according to claim 14, wherein the second membrane layer is of the same material as the membrane layer contiguous with the metallic rigid mounting plate.

16. The anchor arrangement according to claim 1, wherein the membrane layer is conterminous with the metallic rigid mounting plate.

17. A method of mounting an anchor arrangement to a membrane skin of a structure comprising:
   providing an anchor mounting bracket, including a mounting flange provided with an anchor mounting bracket fixing aperture;
   providing a metallic rigid mounting plate arranged to underlay the anchor mounting bracket, wherein the metallic rigid mounting plate has a mounting plate fixing aperture arranged to match up with the anchor mounting bracket fixing aperture;

bonding a membrane layer to the metallic rigid mounting plate so the membrane layer is between the metallic rigid mounting plate and the anchor mounting bracket mounting flange;

wherein the membrane layer is coextensive with the metallic rigid mounting plate.

18. The method according to claim 17, wherein the membrane layer is conterminous with the metallic rigid mounting plate.

19. An anchor arrangement for mounting to a membrane skin of a structure, the anchor arrangement comprising:
   an anchor mounting bracket;
   a metallic rigid mounting plate fixed to the membrane skin of the structure and arranged to underlay the anchor mounting bracket and provided with one or more mounting plate fixing apertures; and
   a membrane layer contiguous with the metallic rigid mounting plate, provided between the metallic rigid mounting plate and the anchor mounting bracket, the membrane layer bonded to the metallic rigid mounting plate over substantially the entire area of the membrane layer;
   wherein the membrane layer is coextensive with the metallic rigid mounting plate.

20. The anchor arrangement according to claim 19, wherein the membrane layer is coterminous with the metallic rigid mounting plate.

\* \* \* \* \*